United States Patent [19]
Hitchcock et al.

[11] Patent Number: 5,823,781
[45] Date of Patent: Oct. 20, 1998

[54] ELECTRONIC MENTOR TRAINING SYSTEM AND METHOD

[75] Inventors: William A. Hitchcock, Oakland, Mich.; Robert C. Allen, Dallas, Tex.

[73] Assignee: Electronic Data Systems Coporation, Plano, Tex.

[21] Appl. No.: 681,745

[22] Filed: Jul. 29, 1996

[51] Int. Cl.⁶ .................................................. G09B 19/00
[52] U.S. Cl. ........................................ 434/118; 434/323
[58] Field of Search ........................... 395/927; 434/118, 434/323

[56] References Cited

U.S. PATENT DOCUMENTS

| | | | |
|---|---|---|---|
| 4,622,013 | 11/1986 | Cerchio | 434/118 |
| 5,263,167 | 11/1993 | Conner, Jr. et al. | 395/700 |
| 5,267,865 | 12/1993 | Lee et al. | 434/350 |
| 5,311,422 | 5/1994 | Loftin et al. | 364/401 |
| 5,387,104 | 2/1995 | Corder | 434/156 |
| 5,388,993 | 2/1995 | McKiel et al. | 434/118 |
| 5,395,243 | 3/1995 | Lubin et al. | 434/118 |
| 5,421,730 | 6/1995 | Lasker, III et al. | 434/118 |
| 5,481,667 | 1/1996 | Bieniek et al. | 395/161 |
| 5,493,658 | 2/1996 | Chiang et al. | 395/375 |
| 5,496,177 | 3/1996 | Collia et al. | 434/118 |
| 5,535,422 | 7/1996 | Chiang et al. | 395/155 |
| 5,577,186 | 11/1996 | Mann, II et al. | 395/806 |
| 5,597,312 | 1/1997 | Bloom et al. | 434/362 |
| 5,602,982 | 2/1997 | Judd et al. | 395/326 |

FOREIGN PATENT DOCUMENTS

0 602 790 A2   6/1994   European Pat. Off. .......... G06F 9/46

*Primary Examiner*—Robert A. Hafer
*Assistant Examiner*—John Edmund Rovnak
*Attorney, Agent, or Firm*—Anthony E. Peterman; L. Joy Griebenow

[57] ABSTRACT

A system and method for training a user on any number of computer software applications. The computer is directed by at least one computer program within a distribution engine 15 to perform a diagnosis of the skill level of a user on a computer software application, prescribe a training plan that will allow the user to achieve a minimum skill level on the computer software application, and provide the user access to a plurality of training software programs to enable a user to complete the training plan.

24 Claims, 3 Drawing Sheets

ELECTRONIC MENTOR TRAINING SYSTEM AND METHOD

TECHNICAL FIELD OF THE INVENTION

The present invention relates generally to electronic systems and methods, more particularly, to a system and method for an electronic mentor to provide training to users on a variety of computer software applications.

BACKGROUND OF THE INVENTION

Computer-based technologies have permeated every segment of today's work environments. Companies have spent billions of dollars on new computer technologies over the last two decades. Often, these companies have not realized a significant return on the investment in these new computer technologies. One factor leading to this problem is the inability for companies to keep the users of the computer software applications (such as software applications and network infrastructures) properly trained.

One solution to this problem is to provide a technical support staff to answer questions users may have concerning application of these computer software platforms. This solution costly. Support personnel may answer the same question for a number of users. Furthermore, support personnel typically cannot provide systematic training, but rather provide "fire-fighting" type training to get a user through a particular problem. This will not provide the user a comprehensive understanding of the computer software application.

Another conventional method used to solve the lack of computer application training has been to send all users to computer training classes. These training classes are designed to give users the ability to use the computer software application. This conventional solution has several limitations. Due to the disparity in proficiency levels of the various users, computer software application training classes do not provide "just enough" training for every user. Computer software application training classes and/or computerized training courses cannot be tailored to every individual user's proficiency level. Each user receives the entire training course. As a result, many users receive training they do not need. This time spent on wasted training also results in lost productivity because a training class takes the users away from their work station.

Further lost productivity occurs because training classes, even when the training is not wasted, cannot be scheduled to optimize when the class occurs for each individual user. Users will often not want to spend the time required "off-the-job" to attend training classes away from their work station. Conventional classroom training and computer-based training are not typically accessible when and where needed for a large workforce that is geographically distributed.

Conventional training solutions are also fixed in time. The training is only good for a particular version of the computer software application. Thus, the training classes must be repeated periodically as computer software applications are replaced or upgraded in order to maintain the users' training.

Furthermore, these conventional training solutions do not provide a method to evaluate the amount of training each individual user needs to bring the individual up to the required proficiency level. These conventional systems do not measure the proficiency level of the users, compare proficiency levels at a later date, track the training accessed by the users, or provide feedback on the effectiveness of the training system.

SUMMARY OF THE INVENTION

The present invention provides a computer software application training system and method that substantially eliminates or reduces disadvantages and problems associated with previously developed computer software application training systems and methods.

More specifically, the present invention provides a system and method for training a user on a variety of computer software applications. The computer is directed by a computer program to perform a diagnosis of the skill level of a user on a computer software application, to prescribe a training plan that will allow the user to achieve a minimum skill level on the computer software application, and to provide the user access to a plurality of training software programs to enable a user to complete the training plan.

In another embodiment, the present invention can store input made by the user in a data base and can analyze that data to provide reports on the amount and effectiveness of the training. The system can also receive updates to the computer program, such as when a new version of a computer software application is released.

The present invention provides an important technical advantage by reducing or eliminating wasted training. The present invention accomplishes this by diagnosing the proficiency level of each user in one or more computer software applications and providing a training plan specifically tailored to each user's proficiency level to raise each user's proficiency level to a predetermined level in each application.

The present invention provides another technical advantage by providing the training directly to the user at the computer at the user's work station. The present invention can increase productivity in the workplace by allowing the user to access training, dynamic help and job aids directly from the user's workstation.

The present invention provides yet another technical advantage by reducing the number of technical support personnel needed to support the users on various computer software applications. The present invention provides training tailored to the user's proficiency level, provides a dynamic help for the user to access, and provides a bulletin board of frequently asked questions that can give users quick answers without having to contact a technical support person.

The present invention provides another technical advantage by providing a training prescription tailored for a specific job type that provides a training strategy for particular users based on the job the user performs.

The present invention provides another technical advantage by allowing continuous and ongoing refreshment/update of the present invention. The present invention can continuously accept updates to the diagnostics, prescriptions, and training treatments. This can occur when, for example, a new version of a computer software application is released.

The present invention provides another technical advantage by allowing an organization to measure the amount and effectiveness of training. The present invention can monitor, for example, the number of users that have taken the diagnostics, the average scores from the diagnostics (for the organization or any subset thereof), the number of users who have accessed the computer-based training, how many times a particular user has accessed the training. This measurement can provide a baseline against which an organization can later compare to determine improvements in user proficiency on various computer software applications.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The present invention provides an integrated learning support system to train users on a variety of computer software applications. The present invention can be directly accessed by users from their desk top computers. The present invention provides a system that diagnoses a user's personal learning needs, provides individual learning prescriptions that guide training through a choice of curricula, provides desk top delivery of the curricula, and measures before and after results of the training. The present invention includes a software distribution engine that drives a series of software programs to enable the integrated learning support system. The present invention can be continuously updated and refreshed to match updates to the computer software applications.

Conventional stand alone computer software application training does not typically address application-to-application or network navigation procedures. As more large businesses and corporations standardize their client/server computing and communications networks to achieve global connectivity, enterprise specific navigation training and job performance support will become as important as applications training to workforce capability and productivity. The present invention allows training in these areas as well.

The present invention provides a cost effective way to distribute computer-based training materials over local area networks while minimizing disruption in normal production work.

In conjunction with the present invention, an organization or company preferably defines minimum skill levels an employee should have in various computer software applications. Herein, the term "computer software application" means any computer-based operations involved in performing the user's job. Computer applications include, for example, standard computer applications (such as Lotus Notes, Windows, Microsoft Word, Excel, etc . . . ), specialized computer applications (for example, computer applications written by the company for its employees to use), and Internet applications. Computer applications further include network infrastructure configurations to encompass, for example, the use of the printers, the use of routing in the network, and other operations performed over the network. It should be understood that the present invention can be used for a variety of computer software applications and network configurations. The present invention involves using different diagnostics, prescriptions, treatments, measurement, and feedback for each application. Thus, the electronic mentor of the present invention can provide an enabling system to train a user on a virtually unlimited variety of computer software applications.

Figure 1:
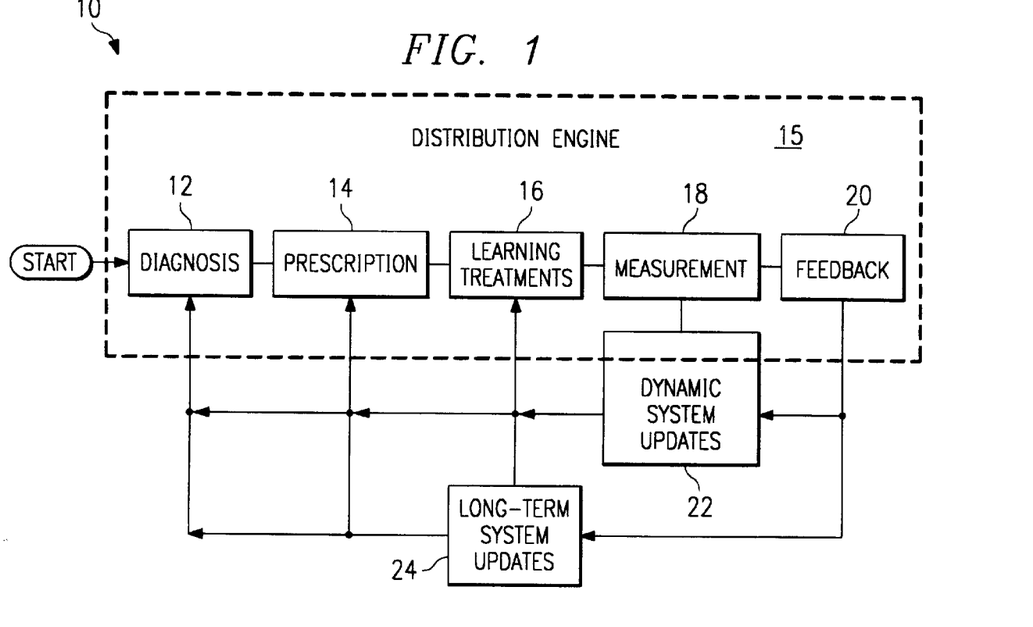
FIG. 1 shows a diagram of a process flow incorporating the teachings of the present invention.

FIG. 1 illustrates a process flow 10 incorporating the teachings of the present invention that includes one embodiment of the distribution engine 15 of the learning support system ("electronic mentor") comprising diagnostic 12, prescription 14, learning treatments 16, measurement 18, and feedback 20. As shown in FIG. 1, the distribution engine 15 can also include a portion of the dynamic system updates 22. The electronic mentor also incorporates long-term system updates 24 designed to keep the electronic mentor current. FIG. 1 shows the long-term updates 24 existing separately from the distribution engine 15, but it should be understood that all or a portion of the long-term updates 24 could reside within the distribution engine 15. The distribution engine 15 represents a computer program that interfaces between the computer programs within the diagnosis, prescription, learning treatments, measurement, and feedback portions of the electronic mentor. The distribution engine 15 also provides the interface between these computer programs and the user. The interface between the user and the electronic mentor can also include a graphical interface (shown in FIG. 5) that provides a user access to the commands to operate the distribution engine 15 and, thereby, to operate the electronic mentor.

The diagnostic 12 comprise at least one computer program containing a series of test questions. A series of test questions can be written for each computer application that an organization uses. These test questions are written to diagnose a user's skill level (proficiency) in the particular computer software application. The test questions can be updated ("refreshed") as each new version of a computer software application is released through either dynamic 22 or long term 24 system updates. A user can access the diagnostic 12 through a graphical interface driven by the distribution engine 15. The questions provide the basis for the diagnosis. The diagnostic 12 evaluates the answers a user provides and diagnoses the skill level of the user with respect to that computer software application. The diagnostic 12 of the electronic mentor creates a profile on the user based on the answers the user provided during the diagnostic evaluation.

From the diagnostic 12, the present invention moves to the prescription 14 to define a prescription having the treatment the user needs to reach the predetermined minimum skill level for each computer application. The prescription 14 includes at least one computer software program that evaluates the answers a user provided during the diagnostic 12 and provides a prescription that defines the type of training a user needs to meet an organization's minimum skill level for the particular computer software application. A user can then follow the prescription provided to meet that predetermined proficiency level. The diagnosis and prescription process can be repeated for any number of computer software applications and for any number of users.

The learning treatment 16 can comprise at least one computer program and can begin with the user taking computer-based training (CBTs) by following instruction provided in the prescription 14. The present invention provides a user access to a variety of treatments, including dynamic help, job aids, modular computer-based training (CBT), and classroom computer training. The dynamic help, job aids, and computer-based training represent examples of computer software programs (learning treatment 18) that preferably reside within the distribution engine 15 of the present invention.

The computer-based training contained within and accessed through the distribution engine 15 can include dynamic help, job aids, and computer-based training (CBT) modules. These three classifications represent different levels of training. The dynamic help provides the least amount of training and is designed for a fairly proficient user. The dynamic help software program can collect (upload) questions from individual users to allow posting of answers within the dynamic help user interface. The dynamic help can also include a bulletin board to post announcements or other information on particular computer software applications. Job aids can describe procedures for computer software application use for a user who has some familiarity with that computer software application. The job aid software programs can describe use procedures related to a computer software application in more detail than the dynamic help. CBT modules are designed for those users who need more in-depth training on a computer software application.

Because the treatments are contained within the distribution engine 15 of the electronic mentor, a user can access any of the computer-aided training (job aid, dynamic help, CBTs, etc . . .) directly from the user's terminal at the user's work station. A user an access most or all of the training recommended in the prescription directly from his or her computer terminal. This allows users to complete training at times that are convenient to the user. Furthermore, the programs contained within learning treatment 18 can be constructed in modules so that the total computer-based training can be broken up into more convenient segments that fit more readily into a user's schedule.

The electronic mentor can also ask the user questions in the diagnostic 12 that define the types of training the user prefers (i.e., computer based training versus classroom training). Thus, during the prescription stage, the software could prescribe classroom training, rather than computer based training, for a user with that preference. Optionally, the electronic mentor can also allow the user to schedule classroom training (as opposed to computer-based training) directly from a catalog contained within the distribution engine 15 of the electronic mentor of the present invention.

The level of treatment 18 prescribed by the prescription 14 depends on the results of the diagnostic 12. For example, two users might both be diagnosed as needing training on Microsoft Word as a treatment. However, user 1 may be more proficient than user 2 based on the diagnostic 12. The prescription 14 of the electronic mentor may only prescribe one CBT module of training in MicroSoft Word for user 1, while prescribing four CBT modules in MicroSoft Word for user 2. Furthermore, a user may need different levels of training on different computer software applications. For example, the present invention may prescribe a user four CBT modules of training on using the Access database as a treatment, but may only prescribe referring to the dynamic help for training in MicroSoft Word, and may not prescribe any training in Excel. By following the treatment recommendations in the prescription 14, a user can reach the determined minimum skill level for each of the computer software programs.

From treatment 16, the electronic mentor process flow moves to the measurement 18. Measurement 18 of the present invention preferably includes a measurement software program that stores information input by the user during the previous steps of diagnosis, prescription, and treatment in a database. Each time the user makes an input during one of these portions, the measurement software program will store the data from that input for later use during the feedback 20 feature of the present invention. This storage of data allows the present invention to create a profile on the user based on the user's inputs. The profile of a user will be constantly updated each time the user accesses the electronic mentor.

The feedback 20 of the distribution engine 15 comprises at least one computer software program that can access the stored user input data to provide reports on the total amount of training accessed and the effectiveness of the training provided to the users. For example, by accessing the stored data, the feedback 20 can provide reports detailing how many job aids have been downloaded, how many times dynamic help has been accessed, how many CBT modules have been accessed, and how many CBT modules have been completed by each user accessing the electronic mentor system. The feedback 20 can also provide a report on the skill level of users before and after training by comparing results of the diagnostic 12 before and after training. This information can give the company an indication of the effectiveness of the training provided to the users. In this way, the organization receives an objective analysis of the proficiency level of their employees on various computer software applications. The feedback 20 can sort users to provide a report on proficiency level by server, by work group, by organization, or by other characteristic. The organization can use this information to measure the level of training the users are getting and if the training process is working.

In another example, if the measurement 18 indicates that the organization as a whole has a low proficiency rating in use of network resources, this information can be sent to the organization. The organization can then decide to create a special class that can be accessed through the mentor. Alternatively, the organization can send out a bulletin over the electronic mentor noting the deficiency and encouraging (or requiring) users to begin the treatment prescribed by the electronic mentor by a specified date.

During dynamic system updates 22, the present invention can receive real-time system updates that continuously refresh the information contained within the software programs in the distribution engine 15. For example, as the users access the dynamic help function of the present invention, this function can be continuously updated based on the questions posed by the users. Users' questions can be analyzed, and answers can be posted within the dynamic help user interface.

The distribution engine 15, as shown in FIG. 1, can provide an automated dynamic system update program 22 that can perform a portion of the dynamic update. The remainder of dynamic updates can either be performed through manual inputs into the various portions of the distribution engine 15. Alternatively, all of the dynamic updates can be performed manually or through a computer program contained within the distribution engine 15.

The present invention also allows dynamic update of the diagnosis, prescription, and treatment programs contained within the distribution engine 15 when a new version of a computer software application is released. For example, if the present invention provides training on Microsoft Word (assume version 2.0), a new version of MicroSoft Word (assume version 2.1) could be released after implementing the present invention. Prior to the new version release, the diagnostic 12 includes a program containing a test question set for MicroSoft Word version 2.0. Likewise, the prescription 14 will depend on the old diagnostic 12 and the treatment 16 will provide training treatment designed to teach a user to better use the old version 2.0. Upon release of the new version 2.1, the programs within the diagnostic 12, the prescription 14, and the treatment 16 can be updated to correspond with the latest software version (version 2.1). The diagnostic test questions contained within a diagnosis program can be modified (if necessary) to test for proficiency on the new software version. Each of the tools used within the electronic mentor system (such as the test questions, the help features, the training and job aids, etc . . . ) can be continuously updated and supplied to the organization (and users) on an ongoing basis. The distribution engine 15 can reside in a server separately from the business organization's graphical user interface. The distribution engine 15 can be updated and the users can access the updated programs immediately through the graphical user interface. In this way, the electronic mentor training system of the present invention can provide training on the latest releases of computer software applications without having to load a new version of the electronic mentor. In an alternative embodiment, the electronic mentor could be configured in a versioned format and when updates to the computer applications occur, a new version of the electronic mentor could be sent to the business organization.

The dynamic system update 22 allows the CET's, the dynamic help, the bulletin board containing the frequently asked questions, the test question sets, and the other software program supported portions of the distribution engine 15 of the electronic mentor to be changed on an ongoing and continuous basis to keep abreast of changes to the computer software applications. This reduces the problem of sending users to computer training and having that training become obsolete within a couple of years. Each time a user accesses the electronic mentor, the distribution engine 15 programs can reflect the latest version of the computer applications due to the dynamic update 22 function. The continuous update allows a user to build on previous knowledge and receive training compatible with the lack of proficiency caused by the update to the computer software application.

The electronic mentor of the present invention can also include a feature that tells a user that the mentor has been updated and what area(s) within the mentor have been updated. The software program within the distribution engine 15 that performs the dynamic system update 22 can conduct a comparison of the previous version of the computer software application with the new version to indicate what features have changed and what features have been added or deleted. In an alternative embodiment, this comparison can be performed manually and loaded into a program residing within the distribution engine 15 that a user can access.

Providing long term updates 24, as shown in FIG. 1, can be a manual step of loading system updates into the distribution engine 15. Long term system updates 24 can include changes to the architecture of the distribution engine 15, such as, adding a new computer software application. For example, a particular embodiment of the present invention can originally have diagnosis, prescription, and treatment software packages for Access and Microsoft Word. A long term system update can include adding Microsoft Mail and Word Perfect diagnosis, prescription, and treatment software packages to provide training on these two additional software applications.

Figure 2:
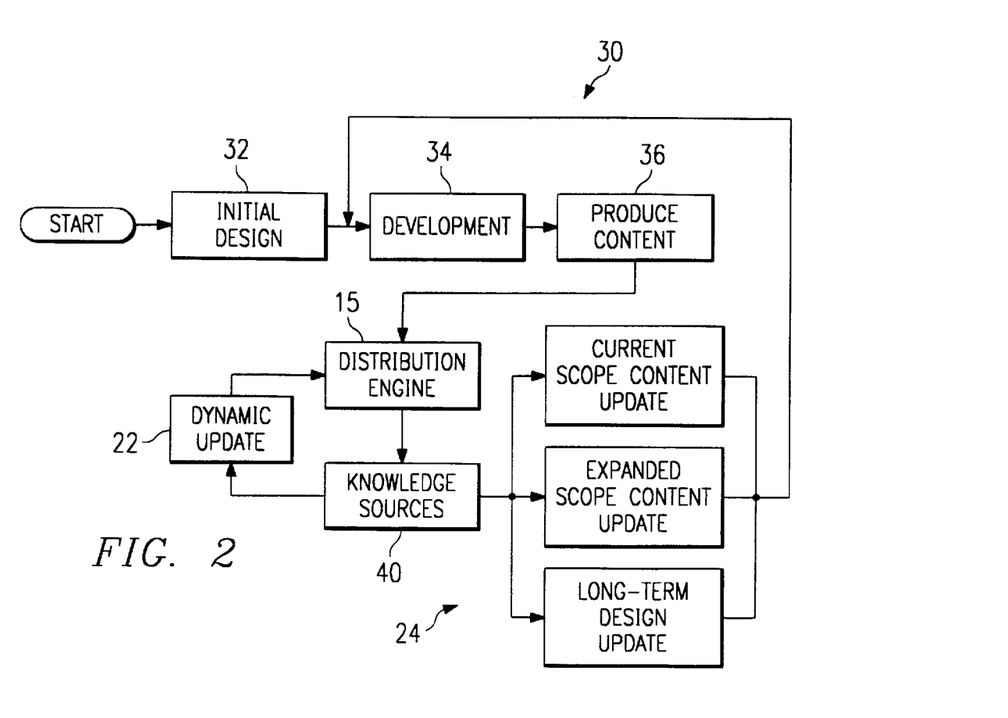
FIG. 2 shows a flow diagram illustrating the functional relationships among specified elements of an embodiment of the present invention.

FIG. 2 is an exemplary functional relationship diagram 30 illustrating the inter-relationship between various portions of the electronic mentor of the present invention. During the initial design 32, the diagnostic program, prescription program, and treatment program of the electronic mentor are defined based on a particular business organization's computer software application training needs. The software programs contained in the distribution engine 15 are built to include both standard and custom content. For example, the standard content for a Microsoft Mail diagnostic program would include test questions on operations routinely performed in Microsoft Mail for any set of potential users. Custom content would include those items tested for, prescribed and treated that are unique to a particular organization or company. For example, if an organization had a need for specialized training in word processing (for example, a temporary secretary agency), the content of the diagnosis, prescription, and treatment software programs for MicroSoft Word could include additional testing and training, in addition to the standard content diagnosis, prescription and treatment software programs on MicroSoft Word.

After the initial design 32, the development 34 of the diagnostic, prescription, and treatment software program modules defined in the initial design occurs. The distribution engine 15 software programs are developed to include the content of the software packages, skill assessment construction tools (to build a profile of the user to include skill level on a particular computer software application), and any other specialized content. The skill assessment tools can be built using a software authoring program. For example, the test questions used in the diagnostic program 12 can be built using a test construction set software program.

At the produce or build content 36 stage, the distribution engine 15 software packages, including the training CBT modules, the job aids, the skill assessment (test set questions), and the training course schedules are built. At this stage the diagnosis, prescription, and treatment software programs are installed into the distribution engine 15.

The distribution engine 15 represents the overall software program that provides the interface between the 1) diagnosis, prescription, and treatment software packages, 2) the user graphical interface, 3) the users, and the 4) dynamic and long-term system update programs and/or personnel. The distribution engine 15 also includes the measurement and feedback software programs that track and store the data input by users that are used to measure the amount and effectiveness of the training. The data input by the users includes the number of times dynamic help and job aids are accessed, the number of users that have completed diagnoses, the user scores on the diagnosis tests, the number of users that have completed CBTs, the number of CBTs completed, the user scores on the diagnosis tests after completing training, and so forth. Based on this user data, feedback 20 can generate reports to indicate the amount of training performed by users, and the effectiveness of that training. This provides a tool that can be used to update the diagnosis, prescription, and treatment program modules if necessary. The feedback software program allows updating (both dynamic and long term) the diagnosis, prescription, and treatment software programs.

As shown in FIG. 2, the distribution engine 15 further provides information to knowledge sources 40. The knowledge sources 40 can include computer software programs that automatically respond to questions from users. The knowledge sources 40 can further include computer software programmers, computer application experts, network infrastructure experts, computer support staff, and others, who can provide both dynamic and long term updates to the various software packages contained within the distribution engine 15 of the present invention. As shown in FIG. 2, the knowledge sources can perform updates to the current software packages within the distribution engine 15 (such as updates to adjust diagnostic questions), to expanded scope software packages to add these software packages to the distribution engine (for example, adding another computer software application), or implementing a long-term design update (such as a change to the distribution engine architecture).

FIG. 5 shows one embodiment of a system 90 used to implement the present invention. To implement the electronic mentor of the present invention to provide training to users within an organization, the electronic mentor distribution engine 15 is preferably loaded on a server 91 connected to a plurality of user computers 92. Both the server 91 and the user computer 92 can have a memory device 94, a data storage device 93, and a processor 96. Typically, the distribution engine 15 software programs will be stored in a memory device 94 in the server 91 and the data will be stored in a storage device 93 in the server 91. The server processor 96 can execute commands contained within the distribution engine 15 software programs. The electronic mentor system will typically include a user graphical interface (similar to that shown in FIGS. 3 and 4) loaded on the user's computer 92 that a user accesses via an input/output device 98, such as a display coupled to a keyboard and/or pointing device (e.g., mouse) as shown in FIG. 5. The graphical user interface serves to connect the user to the distribution engine 15. The distribution engine 15 can be loaded on a server 91 located at the business organization, or can be loaded off-site and accessed through an interface program contained within a server at the organization's site. It should be understood that the implementation of the present invention can occur through a variety of means that enable the users at an organization to access the present invention through some or all of the computers located at the organization.

Figure 3:
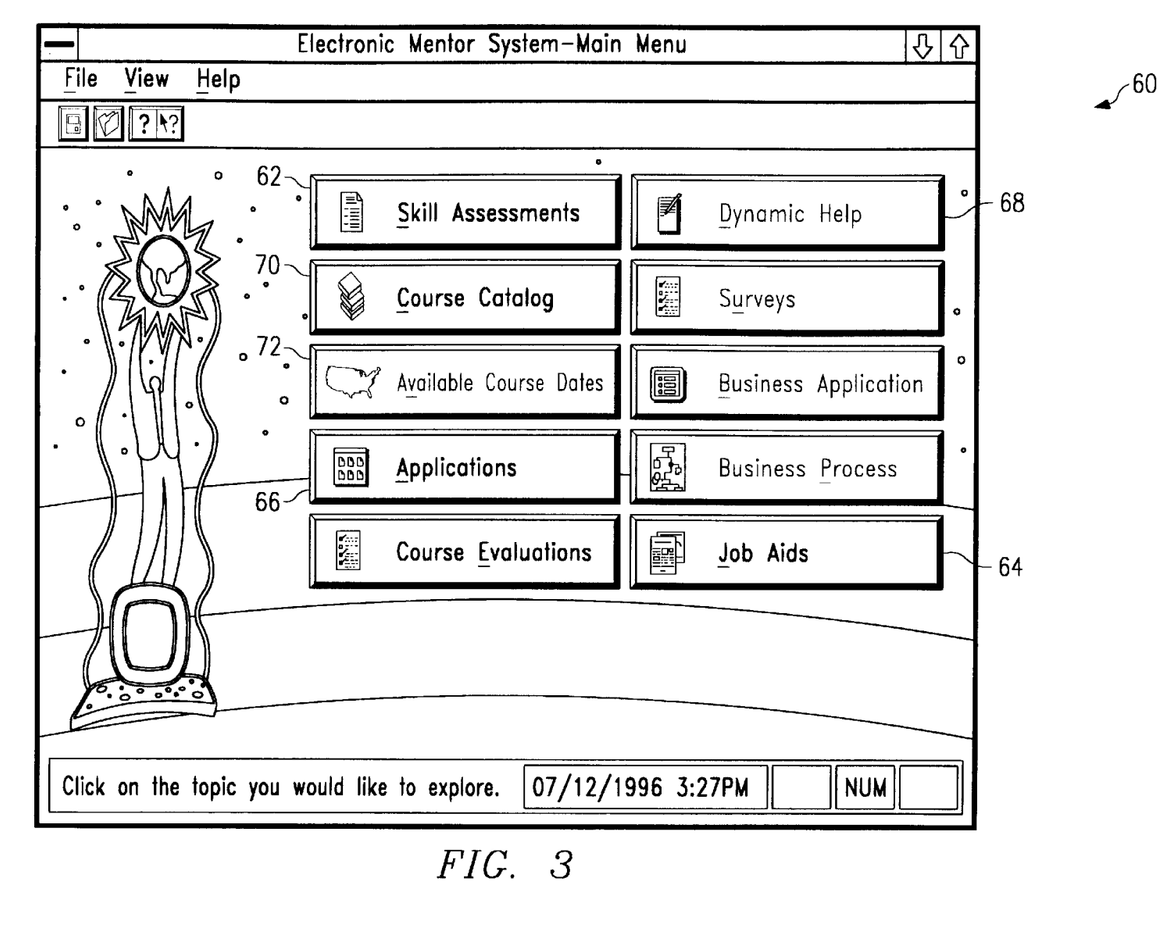
FIG. 3 shows an embodiment of the user interface main menu screen of the present invention that allows users to access the present invention.

To initiate the electronic mentor training system, a user must access the distribution engine 15. A user graphical interface will typically reside on the user's computer, with the majority of the distribution engine 15 software modules (such as the diagnosis, prescription, and treatment software programs) residing on server. FIG. 3 shows an exemplary embodiment of the graphical user interface main menu 60 that a user will see upon entering the electronic mentor system of the present invention.

As shown in FIG. 3, the user can click on the topic to explore by pointing a pointing device on one of the several icons on the main menu screen. To begin a diagnosis, a user will click on the "Skill Assessment" icon 62. Upon doing so, the user will then see a menu of computer software applications icon. The user can get a diagnosis on any of the computer software applications on the menu by clicking on an icon. The diagnostic 12 will then provide a series of questions that the user will answer covering a range of topics about the computer software application chosen. The diagnostic 12 can indicate to the user at the end of each question whether the user correctly answered. The user's total score of correct answers can be displayed at the end of the diagnosis.

Based on the user's answers to the diagnosis test questions, the present invention builds a user profile that defines the user's skill level on the computer software application. The electronic mentor will compare the user's proficiency to the minimum skill level defined by the business organization on that particular computer software application. If the user does not meet the defined skill level, the electronic mentor of the present invention evaluates the level of the deficiency and the program within prescription 14 will prescribe an appropriate training program (i.e., treatment) to remedy the deficiency. The prescription 14 can include a software program for evaluating different areas within a computer software application to determine if a user was deficient in a particular area. For example, a user may have proficiency in sending and receiving mail in MicroSoft Mail, but may be deficient in opening personal folders for storing mail. In this way, the electronic mentor provides a treatment plan that is tailored to the individual needs of the user. This is in contrast to the typical training class that instructs all the participants in the same areas, even though the participants may have vastly different levels of expertise in that computer software application. With the present invention, the customized prescribed treatments are listed for the user on the computer terminal and user can print the prescription for future reference.

The treatment 16 contains computer-based training the user can access to implement the prescription. As shown in FIG. 3, a user can access this computer-based training through the present invention. By clicking on the "Job Aids" icon 64, a user can access a job aids menu screen 80 such as the one shown in FIG. 4. This screen provides an interface to job aids for various computer software applications. By clicking on the icon for the desired computer software application (for example, the "Windows" icon 82), the user can access the job aids for that computer software application. Similarly, referring to FIG. 3, if a user clicks on the "Applications" icon 66, the user will access a screen listing the CBTs for the computer software applications; if the user clicks on the "Dynamic Help" icon 68, the user will access the dynamic help for these applications; if the user clicks on the "Course Catalog" icon 70, the user will access a list of courses that can be scheduled by clicking in the "Available Course Dates" icon 72. The other icons listed in FIG. 3 provide access to other information available to the user, according to this particular example.

Figure 4:
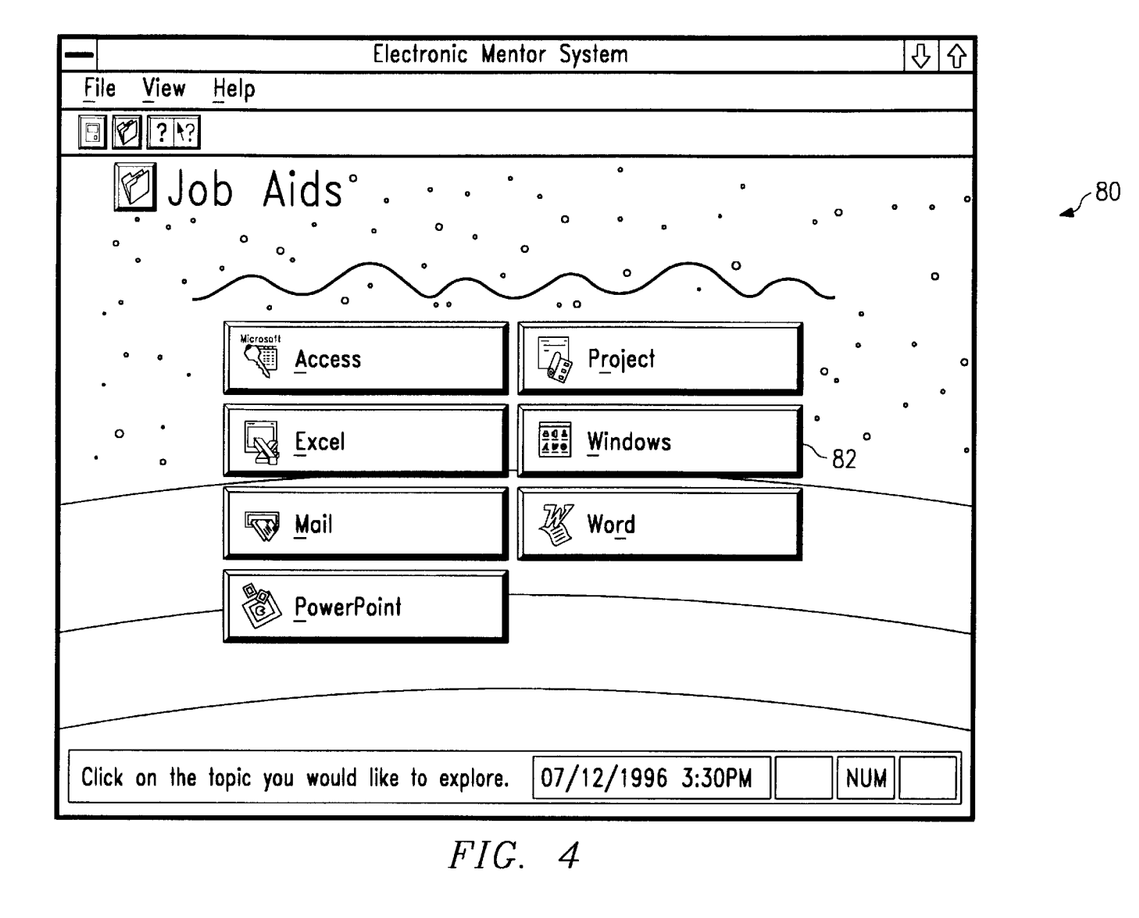
FIG. 4 shows an embodiment of a user interface sub-menu that can be accessed from the user interface main menu of FIG. 3.

As FIGS. 3 and 4 illustrate, a user can receive most or all training through computer-based training at the user's terminal. A user can also get the training needed without getting excess (or wasted) training. For example, the treatment prescribed might be the dynamic help feature of the electronic mentor of the present invention. This treatment would typically be prescribed for a user who has a proficiency in a computer application that is near, but does not meet, the required proficiency level. To access the dynamic help, a user simply points to the dynamic help icon 68 with a pointer (such as a mouse) and starts that dynamic help application. Thus, the user gets a relatively small amount of training that is tailored to the user's proficiency level. This prevents wasting time and the cost of sending a relatively advanced user to training that covers more basic elements of the computer application. In addition to the cost savings due to avoidance of wasted training, the present invention increases a user's training efficiency by 1) allowing the user to get trained at their computer and 2) allowing the user to decide when the training will occur to maximize time efficiency.

The training method of the electronic mentor should also reduce the number of system administrators and technical support personnel by allowing the users to do more of the basic training and updating of skills by themselves. The present invention also provides computer-based answers to frequently asked questions through the dynamic help feature, thus reducing the number of calls to a help desk. These factors reduce training costs associated with maintaining large numbers of support personnel.

Furthermore, the dynamic updates provided to the diagnosis, prescription, and treatment programs ensure a more efficient training program by maintaining up-to-date training. Users that have used the present invention to raise their proficiency level on a computer software application can re-initiate the diagnosis when a new version of the computer software program is released to determine if the user needs further training due to changes resulting from the new version.

The present invention also provides an organization a measurement of both the effectiveness and the amount of training. By recording the user inputs, the present invention can establish the competency level of the users on a particular computer application. The present invention can establish the average, the median, the mean proficiency of the business organization's users (or a subset thereof) by analyzing the users' scores from the diagnoses performed prior to treatment. After users complete the treatments prescribed, the users can again take the diagnostic. At this point, the invention can analyze the proficiency information to provide a comparison between the user's scores before and after training according to the prescription. This will show the level of user improvement on the computer software application due to the training treatment. The present invention can also show the precise number of training events (accessing dynamic help, downloading job aids, completed CBTs, etc . . . ) to indicate to the organization the amount of training that occurred to result in the improvement.

Although the present invention has been described in detail, it should be understood that various changes, substitutions and alterations can be made hereto without departing from the spirit and scope of the invention as described by the appended claims.

What is claimed is:

1. A system for training a user on a computer software application, comprising:

a storage device operable to store data;

a memory device operable to store a computer program;

an input/output device operable to provide a user interface between the user and the system, the input/output device for accepting data indicating the user's knowledge of the software application; and a processor coupled to the storage device, the input/output device, memory device, the processor operable to execute the computer program such that the system is directed by the computer program to:

perform a diagnosis of a skill level of a user on the computer software application, using data accepted by the input/output device;

prescribe a training plan that will allow the user to achieve a predetermined minimum skill level on the computer software application; and provide the user access to a plurality of training software programs to enable the user to complete the training plan.

2. The system of claim 1, wherein the processor is further operable to execute the computer program such that the system is directed by the computer program to:

store input made by the user on the storage device;

analyze the user input; and provide reports containing the analyzed user input.

3. The system of claim 1, wherein the system is further directed by the computer program to receive updates to the computer program to provide accurate diagnosis, updated prescribed training plans, and updated training software programs.

4. The system of claim 3 wherein the updates to the computer program are initiated due to updates in a computer software application.

5. The system of claim 1, wherein the system is further directed by the computer program to provide a set of questions to the user in order to perform the diagnosis of a user's skill level on the computer software application.

6. The system of claim 2, wherein the system is further directed by the computer program to compare the user's skill level based on the diagnosis to a predetermined minimum skill level required on the computer software application prior to prescribing a training plan.

7. The system of claim 2, wherein the system is further directed by the computer program to store input made by the user in a data base on the storage device.

8. The system of claim 2, wherein the system is further directed by the computer program to analyze the user input to provide reports on a number of training software programs the user has accessed.

9. The system of claim 2, wherein the system is further directed by the computer program to analyze the user input to compare the user's skill level on the computer software application prior to the user performing the training recommended in the prescribed training plan to the user's skill level on the computer software application after performing training recommended in the prescribed training plan.

10. The system of claim 1, wherein the system further provides training to a plurality of users on a plurality of computer software applications, and further wherein the system is further directed by the computer program to provide a plurality of users direct access to a plurality of computer software programs at a computer terminal.

11. A computer-readable memory system configured to represent a computer program for directing operation of a computer, comprising:

a distribution engine module comprising:

a diagnosis module operable to direct a computer to perform a diagnosis of a skill level of a user on a computer software application;

a prescription module operable to direct a computer to compare the user's skill level based on the diagnosis of the user to a predetermined minimum skill level required on the computer software application, and further operable to provide a training plan that will allow the user to achieve the predetermined minimum skill level required on the computer software application; and a treatment module operable to provide access to a plurality of training software programs to enable a user to complete the training plan;

a graphical user interface operable to provide a user with an interface to the distribution engine, the graphical user interface for accepting user input and providing the input to the distribution module, the input for determining the user's skill level.

12. The system of claim 11, wherein the distribution engine further comprises:

a measurement module operable to record input made by a user; and a feedback module operable to analyze the user input and provide reports containing the analyzed user input.

13. The system of claim 11, further comprising a dynamic system update module to allow changes to be incorporated to the diagnosis module, the prescription module, and the treatment module of the distribution engine module.

14. The system of claim 11, further comprising a long term system update module to allow architectural changes to be made to the distribution engine module.

15. The system of claim 12, wherein the measurement and feedback modules work in concert to report a total amount of training accessed and a comparative skill level of a user prior to and after completing the prescribed training plan.

16. A method for providing a user training on a computer software application, the method performed by a computer executing a computer program, the process comprising the steps of:

diagnosing a user's skill level on the computer software application;

comparing the user's skill level on the computer software application to a predetermined minimum skill level required for the user on the computer software application;

prescribing a training plan based on the diagnosis and comparison that will provide the user training to achieve the predetermined minimum skill level; and providing the user access to a plurality of computer based training programs to train the user on the computer software application.

17. The method of claim 16, further comprising the steps of:

recording input made by the user in a data base;

analyzing the input to determine the effectiveness of the user training method; and analyzing the input to determine an amount of computer based training accessed.

18. The method of claim 16, further comprising using the prescribed training plan to train the user on the computer software application.

19. The method of claim 17, further comprising updating the computer program based on the analyzed input.

20. The method of claim 16, further comprising updating the computer program when a new version of the computer software application is released.

21. The method of claim 16, wherein the step of diagnosing a user's skill level on a computer software application further comprises the steps of:

preparing a test construction set for diagnosing a user's proficiency on the computer software application;

accepting a user's answers to questions contained in the test construction set; and scoring the user's answers to the questions by comparing the user's answers to correct answers.

22. The method of claim 16, wherein providing the user access to a plurality of computer based training programs to train the user on the computer software application further comprises building a plurality of software modules contained within the computer program for training the user.

23. The method of claim 22, further comprising continuously updating the software modules based on changes and updates to the computer software application.

24. The method of claim 17, wherein analyzing the input to determine the effectiveness of the user training method further comprises comparing the user's skill level prior to the user receiving training on the computer software application to the user's skill level after the user receives training on the computer software application.

\* \* \* \* \*